Jan. 10, 1939.  H. A. CURTIS ET AL  2,143,001

PRODUCING PHOSPHORUS

Filed Dec. 7, 1935

Harry A. Curtis
Raymond L. Copson
INVENTORS

BY Arthur L. Davis
ATTORNEY

Patented Jan. 10, 1939

2,143,001

UNITED STATES PATENT OFFICE 2,143,001

PRODUCING PHOSPHORUS

Harry A. Curtis, Knoxville, Tenn., and Raymond L. Copson, near Sheffield, Ala.

Application December 7, 1935, Serial No. 53,324

2 Claims. (Cl. 23—223)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to us of any royalty thereon.

This invention relates to a process for producing elemental phosphorus by the electric furnace method, particularly by the use of a resistance type electric furnace.

One of the objects of this invention is to provide a means for the production of elemental phosphorus which eliminates the difficulty of disposing of the residual carbon monoxide, containing very small proportions of phosphorus which can only be removed with considerable difficulty. Another object of this invention is to utilize the calorific value of the carbon monoxide in the gaseous reduction products. Still another object of this invention is to utilize more effectively the electric power required in an electric phosphate reduction furnace. Other objects of this invention include the provision for more favorable conditions for reaction between the constituents of a phosphate reduction furnace charging stock.

We have discovered a novel method for the more economical production of elemental phosphorus by fusing the phosphate rock and silica portions of a phosphate reduction furnace charging stock using phosphate reduction furnace gas, from which the major portion of the elemental phosphorus has been removed, as the fuel for effecting the fusion, and then reacting the molten mixture of phosphate rock and silica, below the electrodes in an electric furnace, with carbon which has been heated to incandescence by acting as a resistor in passing downwardly between the electrodes. The major portion of the elemental phosphorus contained in the reduction furnace gas is subsequently condensed and separated from the gas.

Figure 1:
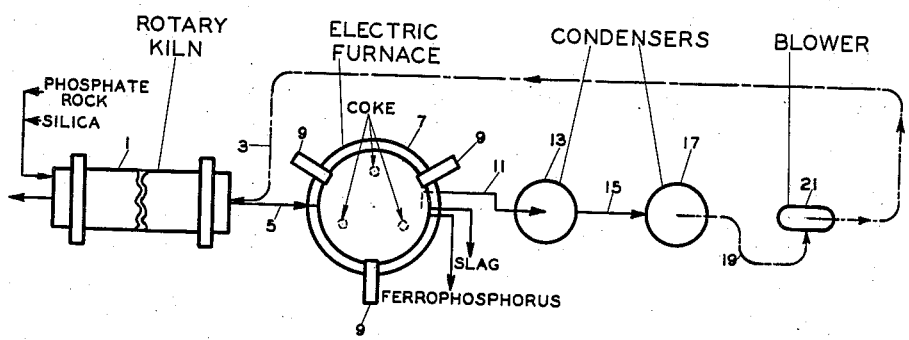
Figure 2:
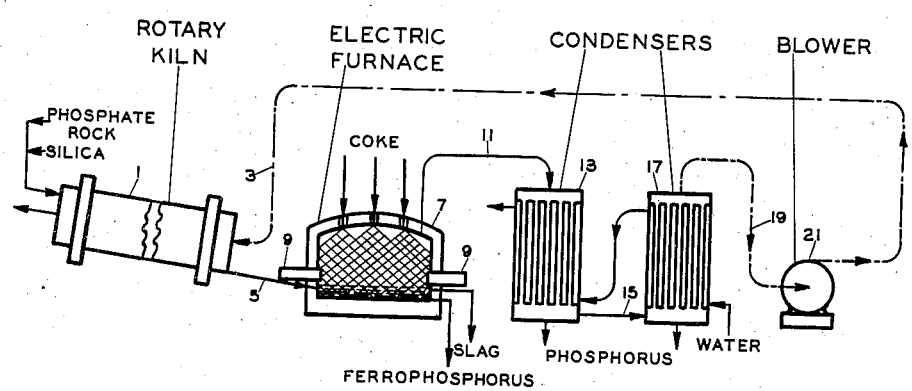

In the accompanying drawing, which forms a part of the specification, and wherein reference symbols refer to like parts whenever they occur, Fig. 1 is a diagrammatic, plan view of one form of apparatus for the embodiment of our invention, Fig. 2 is a diagrammatic, vertical, sectional view of the form of apparatus shown in Fig. 1.

In Fig. 1, and in Fig. 2, the phosphate rock and the silica portions of a phosphate reduction furnace charging stock are fed to a rotary kiln 1, which is fired with a phosphate reduction furnace gas, from which the major portion of the elemental phosphorus has been removed, admitted to the burner through line 3. The mixture of the phosphate rock and the silica is fused in the rotary kiln 1, withdrawn through line 5, and delivered to the electric furnace 7, below the electrodes 9, and adjacent to the level of the zone of maximum temperature in the furnace between the electrodes 9. Coke is fed to the zone above the top of the electrodes 9, through a plurality of inlets located in the top of electric furnace 7, to a predetermined height, which is sufficient to submerge the coke, heated to incandescence between the electrodes 9, to substantially the entire depth of the molten mixture of phosphate rock and silica in the bottom of the furnace. The calcium silicate slag and the ferrophosphorus formed are withdrawn from the furnace hearth at points substantially opposite the point of admission of the molten mixture of phosphate rock and silica. The gas produced by the reduction of the molten mixture of phosphate rock and silica by the coke, consisting of carbon monoxide and elemental phosphorus, rises through the coke portion of the charge and is withdrawn from the top or near the top of the furnace 7, through line 11. The phosphate reduction furnace gas passes from line 11, to condenser 13, where the gas is cooled indirectly by the use of water to a temperature not lower than the melting point of elemental phosphorus. The major portion of the elemental phosphorus is condensed to a liquid and is withdrawn from the bottom of condenser 13. The cooled gas, from which a substantial portion of the phosphorus has been removed, still contains some liquid phosphorus in suspension as well as some uncondensed phosphorus. This gas passes from condenser 13, through line 15, to condenser-separator 17, which is also cooled indirectly by water to a temperature not below the melting point of phosphorus. Some further condensation of elemental phosphorus is thereby effected together with the separation of the elemental phosphorus which was condensed in condenser 13, but which had not separated by the time the gas left that condenser. The gas leaving condenser-separator 17, still contains a very small portion of elemental phosphorus which is not condensable at the temperature of the melting point of phosphorus. This gas is withdrawn through line 19 through the inlet of blower 21, which serves to maintain a substantially atmospheric pressure in electric furnace 7, and is discharged into line 3, as the fuel for fusing the mixture of the phosphate rock and silica in the rotary kiln 1.

It is evident that there are numerous factors which will influence conditions for the most satisfactory operation of our invention, the actual limits of which cannot be established except by a detailed study of each set of raw materials and the intermediate and finished products involved.

The phosphate rock and the silica are used in the proper stoichiometrical proportion for reduction with incandescent carbon to form elemental phosphorus and a calcium silicate slag of the desired melting point.

The mixture of the phosphate rock and silica may be fused in any suitable type furnace, such as a shaft furnace or a rotary kiln. The mixture of the phosphate rock and silica may be fused by the use of any suitable fuel but we have found it most economical and most advantageous, from the standpoint of the disposal of the traces of phosphorus remaining in phosphate reduction furnace gas after the removal of the major portion of the elemental phosphorus by conventional condensing means, to use this phosphate reduction furnace gas containing only traces of elemental phosphorus as the source of the fuel. This trace of elemental phosphorus is converted to phosphorus pentoxide during the combustion of the gas with the required amount of air and the phosphorus pentoxide so formed reacts with the phosphate rock and thereby eliminates a hazard and a nuisance.

The enclosed electric furnace used has a steel shell and a refractory lining. It is preferably a three phase alternating current resistor furnace, although under certain circumstances, a single phase alternating current or even a direct current might be used. The plurality of electrodes are located in the furnace wall either even with or projecting moderately through the furnace wall, at an elevation slightly above the elevation of the top of the layer of the molten charge on the hearth. These electrodes may either be carbon electrodes or water cooled metal or alloy electrodes, as desired. The furnace hearth is provided with an inlet for the molten mixture of phosphate rock and silica on one side and outlets for the calcium silicate slag and the ferro-phosphorus formed substantially opposite the inlet.

A solid carbonaceous material, preferably coke, charged into the furnace above the elevation of the electrodes either through one or plurality of inlets is heated to incandescence as it serves as an electrical resistor during its passage between the electrodes. The column of coke above the elevation in the top of the molten liquid on the hearth is maintained at a sufficient height to submerge the incandescent carbon passing from the zone between the electrodes into the molten liquid on the hearth so that the column of coke actually rests on the hearth of the furnace. By this means it is possible to maintain an intimate contact between the reactants, with incandescent coke being supplied for the reaction automatically as the carbon in the coke in contact with the molten portion of the charge reacts to form carbon monoxide.

Although it is ordinarily preferable to use a solid carbonized material, such as coke, for accomplishing the reduction in this process, under certain circumstances solid uncarbonized materials may be charged in place of the solid carbonized material. Anthracite coal, for example, may be used as a source of the carbon required for the reaction.

The major portion of the elemental phosphorus contained in the phosphate reduction furnace gas produced by our process may be separated from the uncondensed constituents of the mixture by direct or indirect cooling with water, with the indirect cooling being preferable. One or a plurality of condensers may be used with one or more of the condensers serving as separators for the removal of the major portion of the phosphorus mist from the gas after the elemental phosphorus has been condensed to a liquid state. The temperatures to which the gas may be cooled during condensing will vary depending upon the design and number of condensers or condenser-separators used. In any event the temperature in the gas will not ordinarily be reduced to below the melting point of phosphorus in order that the liquid phosphorus separated may be readily withdrawn.

It will be seen, therefore, that this invention actually may be carried out by the modification of certain details without departing from its spirit or scope.

We claim:

1. Process for producing elemental phosphorus, which comprises charging a molten mixture of phosphate rock and silica below and adjacent to the zone of maximum temperature in an electric furnace, which is between the electrodes; maintaining the liquid level in the furnace below the zone of maximum temperature; feeding coke into the electric furnace above the zone of maximum temperature in the furnace; maintaining a column of the coke of such height above the level of the molten mixture of phosphate rock and silica as to cause the coke to penetrate substantially the entire depth of the molten mixture; reducing the charge of molten phosphate rock and silica with the coke heated by the electrical current applied to the coke alone in the zone above and adjacent to the surface of the molten mixture of phosphate rock and silica, to form a phosphate reduction furnace gas containing elemental phosphorus and a calcium silicate slag; withdrawing the calcium silicate slag from the furnace hearth; condensing the elemental phosphorus in the phosphate reduction furnace gas withdrawn from the furnace in an indirectly cooled condenser; separating the liquid elemental phosphorus from the uncondensed portion of the phosphate reduction furnace gas; and fusing the phosphate rock and the silica portions of the charge by direct contact with the products of combustion of the uncondensable phosphate reduction furnace gas from which the major portion of the elemental phosphorus has been separated.

2. Process for producing elemental phosphorus, which comprises charging a molten mixture of phosphate rock and silica below and adjacent to the zone of maximum temperature in an electric furnace, which is between the electrodes; maintaining the liquid level in the furnace below the zone of maximum temperature; feeding a solid carbonaceous material into the electric furnace above the zone of maximum temperature in the furnace; maintaining a column of the solid carbonaceous material of such height above the level of the molten mixture of phosphate rock and silica as to cause the carbonized material to penetrate substantially the entire depth of the molten mixture; reducing the charge of molten phosphate rock and silica with the carbonized material heated by the electrical current applied to the carbonized material alone in the zone above and adjacent to the surface of the molten mixture of phosphate rock and silica, to form a phosphate reduction furnace gas containing elemental phosphorus and a calcium silicate slag; withdrawing the calcium silicate slag from the furnace hearth; condensing the elemental phosphorus in the phosphate reduction furnace gas withdrawn from the furnace in an indirectly cooled condenser; separating the liquid elemental phosphorus from the uncondensed portion of the phosphate reduction furnace gas; and fusing the phosphate rock and the silica portions of the charge by direct contact with the products of combustion of the uncondensable phosphate reduction furnace gas from which the major portion of the elemental phosphorus has been separated.

HARRY A. CURTIS.
RAYMOND L. COPSON.